March 2, 1948. H. E. PAGE 2,436,936
VARIABLE SPEED DRIVE
Filed May 22, 1944 2 Sheets-Sheet 2

INVENTOR.
Herbert E. Page
BY
Atty.

Patented Mar. 2, 1948

2,436,936

UNITED STATES PATENT OFFICE 2,436,936

VARIABLE-SPEED DRIVE

Herbert E. Page, Pasadena, Calif.

Application May 22, 1944, Serial No. 536,698

4 Claims. (Cl. 318—8)

This invention has to do with variable speed drive mechanisms.

Conventional variable speed drives or speed-reducing mechanisms operate by virtue of placing resistances in the motor circuit to obtain lower speeds or by worm or other gear reduction means. The resistance method, however, is inefficient because the speed reduction is accompanied by a corresponding reduction in the torque. The ideal result which those working in this art have sought is the obtaining of a wide range of speed reductions while maintaining high pulling torque. The gear reduction method leaves much to be desired because while it is possible to obtain by that method both low speed and high torque, it is impossible without having an inordinate number of gear trains to obtain speed variations over any appreciable range.

It has also been proposed to control the motor speed by using slip rings to draw off current generated in the rotor and dissipating this current by variable resistances, thus varying the motor speed. However, this method of speed control is inefficient, wasteful, provides only a limited speed control range, and the speed is not stable under varying load.

It is an object of my invention to overcome those difficulties and shortcomings and to provide a variable speed drive in which speed reduction over a wide range may be achieved without any appreciable loss of driving torque.

It is also an object of the invention to provide a variable speed drive device by which low speed-high torque may be achieved by coordinating and combining both electrical and mechanical means.

A further object is the provision of a variable speed drive which has maximum efficiency not only in its range of speed variations, but also in current consumption.

Figure 1:
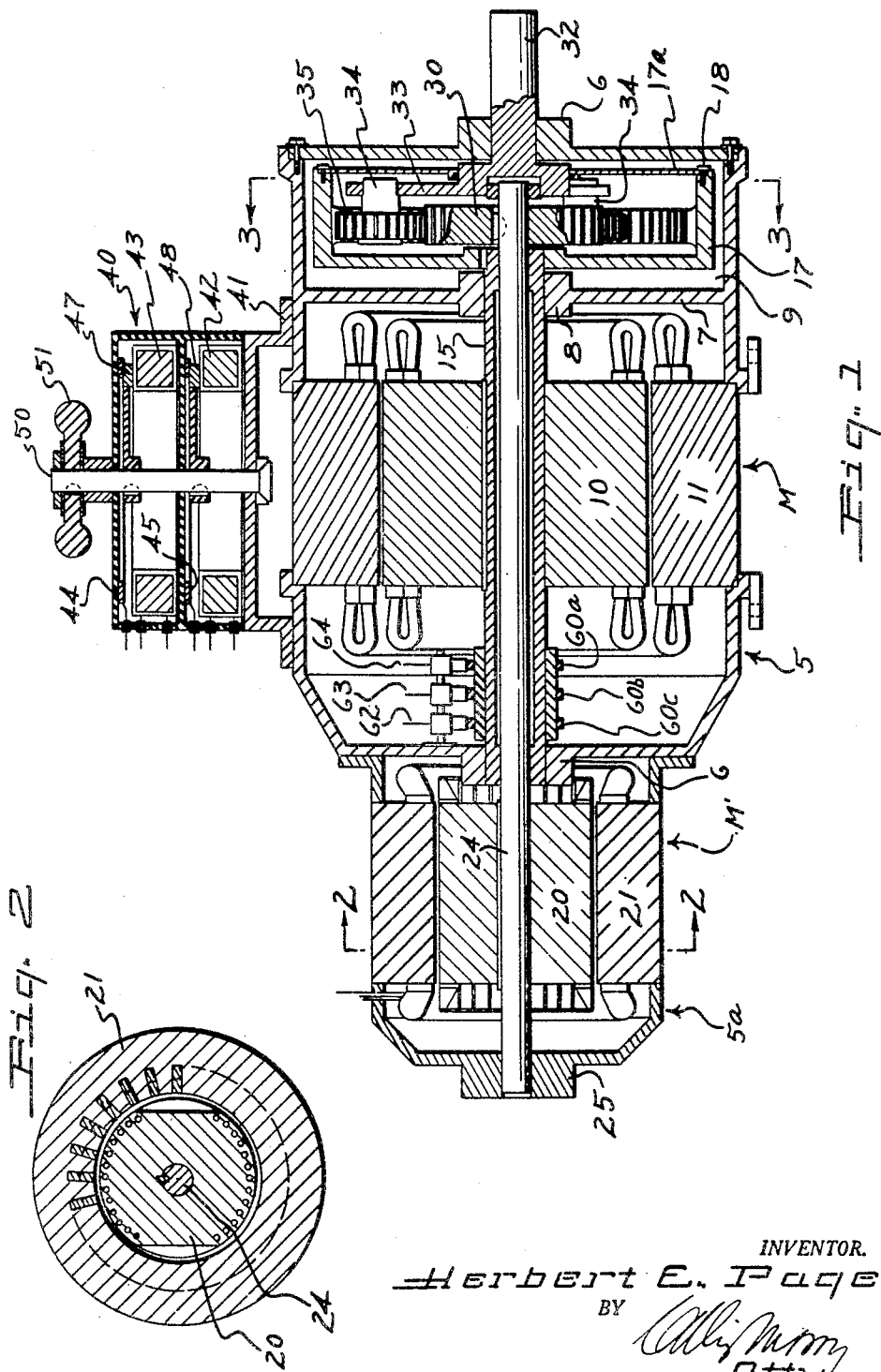
Figure 2:
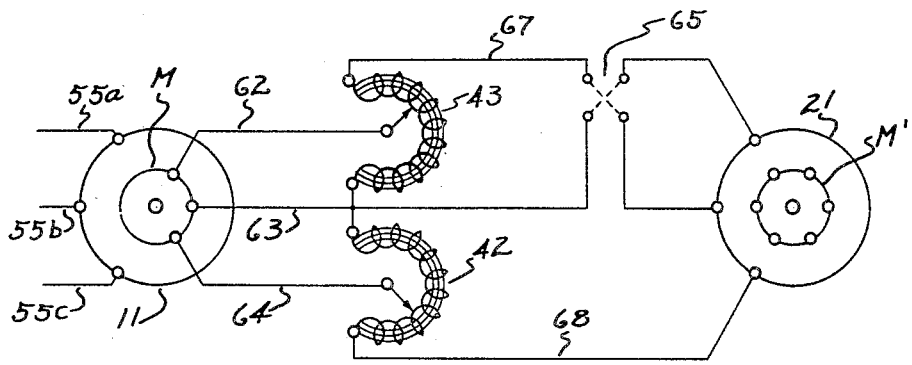
Figure 3:
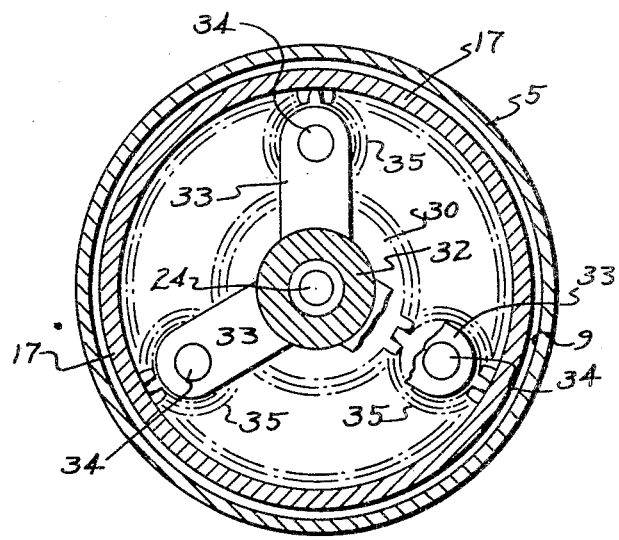

While I have particularly pointed out some of its major objects, my invention possesses still further features of novelty and utility which, in some respects, are subsidiary to the main objects and which will become apparent to those skilled in the art from a reading of the ensuing description of one preferred embodiment which I have chosen for the purpose of explaining the invention, and for which purpose I shall refer to the accompanying drawings, in which:

Fig. 1 is a medial section;
Fig. 2 is a section on line 2—2 of Fig. 1;
Fig. 3 is a section on line 3—3 of Fig. 1; and
Fig. 4 is a circuit diagram.

In the following described example of my invention, I utilize, in combination with a ring and planetary gears, a main drive motor and a control motor, the control motor being fed with current through a voltage control from the slip rings which take from the main drive motor the current generated in the rotor thereof. The rotor of the main drive motor is operatively connected with a ring gear, the control motor is operatively connected with the sun gear of the planetary, and the shaft to be driven is operatively connected with the planet gears. It is well known that if the ring and sun gears of the planetary are oppositely driven at equal speeds commensurate with their relative ratios, any shaft operatively connected with the planet gears will remain stationary and the speed of the driven shaft will therefore be governed by the relative difference in speed of rotation of the sun and planet gears. Thus my invention takes advantage of this characteristic in combination with the electrical controls which I shall describe.

For instance, in the drawings, I show a housing 5 having bearings 6 in its end walls and a partition wall 7 carrying a bearing 8, the partition wall defining the inner limits of a gear chamber 9.

The numerals 10, 11 denote, respectively, the rotor and stator of a main drive electric motor M, the rotor 10 being secured on a tubular shaft 15 journalled in bearings 6, 8 and keyed to a ring gear 17 which has a cover plate 17a secured by screws 18.

The numerals 20, 21 denote, respectively, the rotor and stator of a control motor M', whose rotor 20 is secured on a shaft 24 journalled at its left-hand end in a bearing 25 carried by the end wall of an auxiliary housing 5a and which extends axially through the hollow shaft 15, being keyed at its right-hand end to the sun gear 30 of the planetary.

A driven power-transmitting shaft 32 is journalled in one of the bearings 6 and terminates at its inner end in a spider 33 to which spindles 34 are secured, said spindles rotatively carrying planet gears 35 which mesh with both the sun gear and the ring gear 17, three of the planet gears being here shown.

A voltage regulator 40 of the variable tap auto transformer type is mounted on a support 41 carried by housing 5. Said voltage regulator is of well known construction, having coils 42, 43, contact rings 44, 45, and contact arms 47, 48 secured on a rotatively journalled shaft 50 carrying an operating wheel 51.

The main drive motor M is a conventional three-phase electrical motor whose stator 11 is connected with a three-phase electrical source through wires 55a, 55b, 55c.

Three slip rings 60a, 60b, 60c are conductively connected with the windings in the rotor 10. The slip rings are in turn connected by wire 62 with the contact ring of voltage regulator coil 43; by wire 63 with coils 42, 43, and with stator 21 through a reversing switch 65 (Fig. 4); and by wire 64 with the contact ring of voltage regulator coil 42. A wire 67 connects coil 43 with the stator 21 through the reversing switch 65 and a wire 68 connects coil 42 with stator 21.

The operation and cooperation of the described elements to perform the objects of the invention will be readily understood—that is, from the well-known principles of planetary gearing it will be apparent that any desired variation in the speed of the driven shaft 32 may be obtained by varying the relative speeds or direction of rotation of the sun and ring gears of the planetary unit or by maintaining the sun gear stationary while rotating the ring gear.

It will be observed that if the speed of either or both those motors is varied relative to the other, the varying speeds will be reflected through the planetary system to shaft 32. In operation the speed of rotor 20 is controlled entirely by the slip frequency which is generated in motor M due to the difference between the actual speed of rotation of rotor 10 and the speed of the rotating magnetic field in stator 11, by M' becoming a generator if the load is positive but acting as a motor if the load is negative.

If desired, rotor 20 can be made of permanent N-S magnet type for the purpose of decreasing slippage between rotor 20 and the magnetic field of stator 21.

From the foregoing it will be observed that my variable speed drive is capable of an extremely wide range of speed variation without appreciable loss of torque, and it is highly efficient and economical in that it utilizes the slippage generated current of the main drive motor.

I claim:

1. A variable speed device comprising a housing, a tubular shaft journalled in the housing, an electric main motor having its rotor operatively connected to said tubular shaft, a second shaft mounted for rotation in and relative to the tubular shaft, an electric control motor having its rotor operatively connected to the second shaft, circuit means for operating the control motor in response to current generated in the main motor, a planetary gear unit including a ring gear operatively connected to the tubular shaft, a sun gear operatively connected to the second shaft and planet gears meshing with the ring and sun gears, a driven shaft, journal means for the driven shaft, and planet gear mounting means carried by and disposed radial to the driven shaft, said planetary unit being operable to vary the speed of the driven shaft in response to differences in the relative speeds of the tubular shaft and the second shaft.

2. A variable speed device comprising a housing, a tubular shaft journalled in the housing, an electric main motor having its rotor operatively connected to said tubular shaft, a second shaft mounted for rotation in and relative to the tubular shaft, an electric control motor having its rotor operatively connected to the second shaft, circuit means for operating the control motor in response to current generated in the main motor, voltage regulating means in said circuit means, a planetary gear unit including a ring gear operatively connected to the tubular shaft, a sun gear operatively connected to the second shaft and planet gears meshing with the ring and sun gears, a driven shaft, journal means for the driven shaft, and planet gear mounting means carried by and disposed radial to the driven shaft, said planetary unit being operable to vary the speed of the driven shaft in response to differences in the relative speeds of the tubular shaft and the second shaft.

3. A variable speed device comprising a housing, a tubular shaft journalled in the housing, an electric main motor having its rotor operatively connected to said tubular shaft, a second shaft mounted for rotation in and relative to the tubular shaft, an electric control motor having its rotor operatively connected to the second shaft, circuit means for operating the control motor in response to current generated in the main motor, a voltage regulator and a reversing switch in said circuit, a planetary gear unit including a ring gear operatively connected to the tubular shaft, a sun gear operatively connected to the second shaft and sun gears meshing with the ring and planet gears, a driven shaft, journal means for the driven shaft, and planet gear mounting means carried by and disposed radial to the driven shaft, said planetary unit being operable to vary the speed of the driven shaft in response to differences in the relative speeds of the tubular shaft and the second shaft.

4. A variable speed device comprising, in combination with a driven shaft, a planetary unit including ring, sun and planet gears, said planet gears being operatively connected to the driven shaft, a drive shaft operatively connected to one of the other gears, a main electric motor operatively connected to the drive shaft, a second drive shaft operatively connected to the other gear, a control motor operatively connected to the latter shaft, electrical conductors connecting the stator of the control motor with the rotor of the main motor whereby to operate the control motor by current generated by the main motor, and a voltage regulator operatively connected with said conductors to variably control said operation of the control motor, the speed of said driven shaft thereby being automatically variable in response to relative variations in operation of the motors.

HERBERT E. PAGE.

REFERENCES CITED

The following references are of record in the file of this patent:

UNITED STATES PATENTS

| Number | Name | Date |
| --- | --- | --- |
| 711,663 | Herdman | Oct. 21, 1902 |
| 855,623 | Emerson | June 4, 1907 |
| 1,270,028 | Henderson | June 18, 1918 |
| 1,511,342 | James | Oct. 14, 1924 |
| 1,828,944 | Rossman | Oct. 27, 1931 |
| 2,346,877 | Trofimov | Apr. 18, 1944 |